US011238670B2

(12) United States Patent
Six et al.

(10) Patent No.: US 11,238,670 B2
(45) Date of Patent: Feb. 1, 2022

(54) DETERMINING THE PASSING TIME OF A MOVING TRANSPONDER

(71) Applicant: MYLAPS B.V., Haarlem (NL)

(72) Inventors: Mark Six, Heemskerk (NL); Rowan Waldemar Urbanowitz, Hoofddorp (NL); Adriaan Klaas Verwoerd, Hoofddorp (NL)

(73) Assignee: MYLAPS B.V., Haarlem (NL)

( * ) Notice: Subject to any disclaimer, the term of this patent is extended or adjusted under 35 U.S.C. 154(b) by 582 days.

(21) Appl. No.: 15/537,215

(22) PCT Filed: Dec. 17, 2015

(86) PCT No.: PCT/EP2015/080352
§ 371 (c)(1),
(2) Date: Jun. 16, 2017

(87) PCT Pub. No.: WO2016/097215
PCT Pub. Date: Jun. 23, 2016

(65) Prior Publication Data
US 2018/0122158 A1    May 3, 2018

(30) Foreign Application Priority Data

Dec. 19, 2014 (EP) .................................. 14199413

(51) Int. Cl.
*G07C 1/24* (2006.01)
*G04F 10/10* (2006.01)
(Continued)

(52) U.S. Cl.
CPC .............. *G07C 1/24* (2013.01); *G04F 10/10* (2013.01); *H04B 17/318* (2015.01); *H04W 4/023* (2013.01)

(58) Field of Classification Search
CPC .............. G07C 1/22; G07C 1/24; G04F 10/10
See application file for complete search history.

(56) References Cited

U.S. PATENT DOCUMENTS 4,315,242 A    2/1982  Lueg
5,091,895 A *  2/1992  Chatwin ................ G01V 15/00
                                            340/323 R
(Continued)

FOREIGN PATENT DOCUMENTS

CN    103877718 A    6/2014
CN    104200250 A    12/2014
(Continued)

OTHER PUBLICATIONS

Japanese Office Action for Japanese patent application No. 2017-532162, filed Jun. 15, 2017, dated Oct. 29, 2019, with English translation.
(Continued)

*Primary Examiner* — Daniel P Wicklund
(74) *Attorney, Agent, or Firm* — Steven M. Koehler; Westman, Champlin & Koehler, P.A.

(57) ABSTRACT

In a method for determining the passing time of a moving transponder passing a detection antenna of a base station, a sequence of first signals are exchanged between a first transponder coil and the detection antenna, and a sequence of second signals are exchanged between a second transponder coil and the detection coil. The first and/or second signals are associated with time instances indicating the time when the first and/or second signals are exchanged between the transponder and the base station. The passing time of said transponder is determined on the basis of the signal strengths of the first and second signals and the time instances.

16 Claims, 12 Drawing Sheets

(51) Int. Cl.
*H04B 17/318* (2015.01)
*H04W 4/02* (2018.01)

(56) References Cited

U.S. PATENT DOCUMENTS

| | | | |
|---|---|---|---|
| 5,594,448 A * | 1/1997 | d'Hont | G01S 3/30 340/935 |
| 2002/0033752 A1* | 3/2002 | Greenwood | G07C 9/00309 340/5.61 |
| 2004/0160355 A1 | 8/2004 | Bervoets | |
| 2008/0074954 A1 | 3/2008 | Moritani | |
| 2010/0227659 A1 | 9/2010 | Claver | |
| 2012/0087421 A1* | 4/2012 | Six | G07C 1/24 375/259 |
| 2014/0169140 A1* | 6/2014 | Bisig | G04F 8/08 368/2 |
| 2015/0116497 A1* | 4/2015 | Doval | G01S 7/412 348/157 |
| 2016/0033635 A1* | 2/2016 | Hansen | G01S 13/75 342/451 |
| 2016/0279500 A1* | 9/2016 | Zanetta | A63B 71/06 |

FOREIGN PATENT DOCUMENTS

| | | |
|---|---|---|
| DE | 2914137 | 8/1980 |
| EP | 1447681 | 8/2004 |
| EP | 2439703 | 4/2012 |
| EP | 2453415 A1 | 5/2012 |
| EP | 2747036 | 6/2014 |
| JP | 2006068186 A | 3/2006 |
| TW | 201123798 A | 7/2011 |
| TW | 201251255 A | 12/2012 |

OTHER PUBLICATIONS

Taiwanese Office Action, dated Feb. 14, 2019 for corresponding Taiwanese Patent Application No. 104142620.
Taiwanese Office Action, dated Sep. 10, 2019, for corresponding Taiwanese Patent Application No. 104142620.
International Search Report and Written Opinion from PCT/EP2015/080352, dated Feb. 5, 2016.
Notification of the First Office Action for Chinese Patent Application No. 201580068326.0, dated Jun. 2, 2020.

* cited by examiner

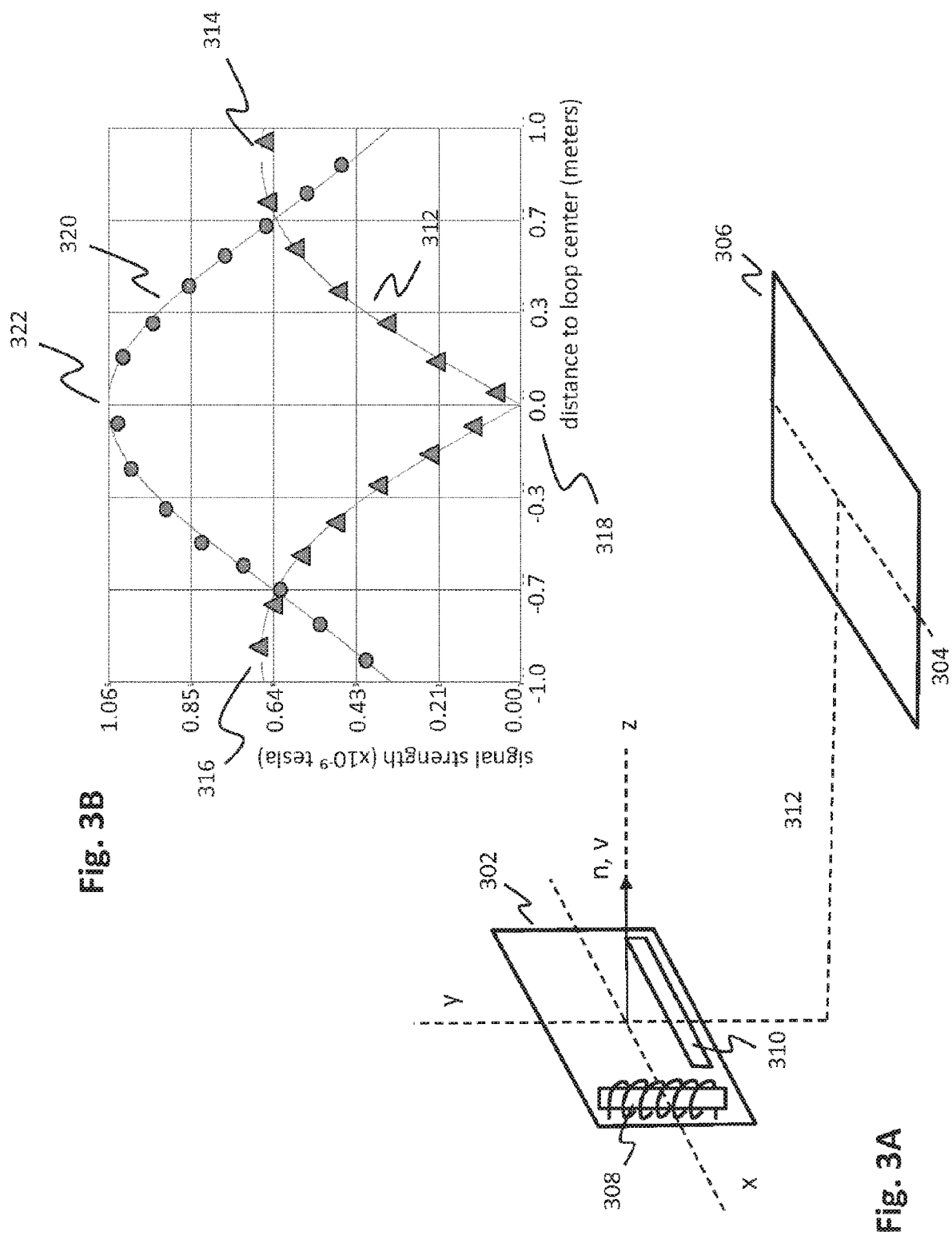

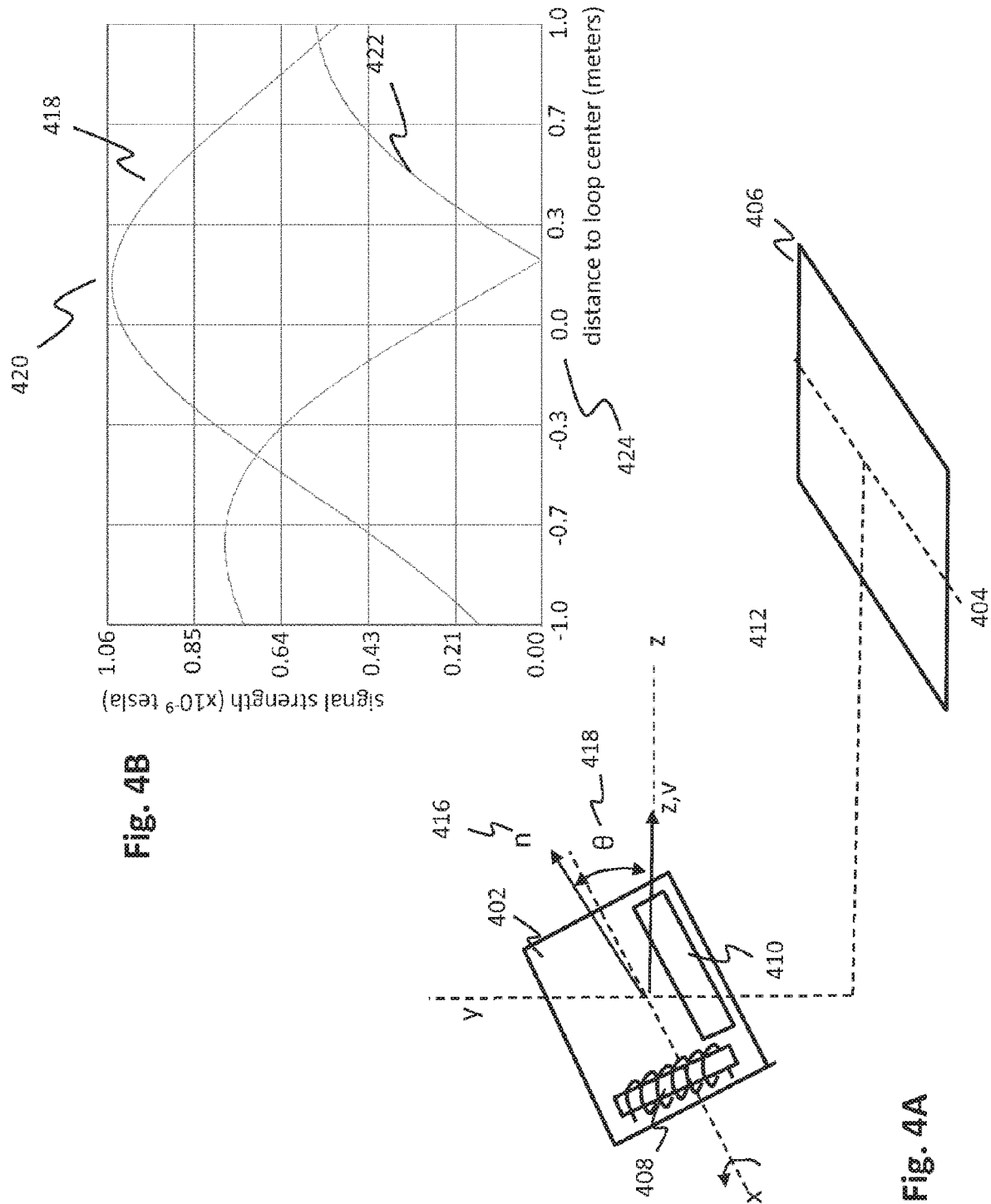

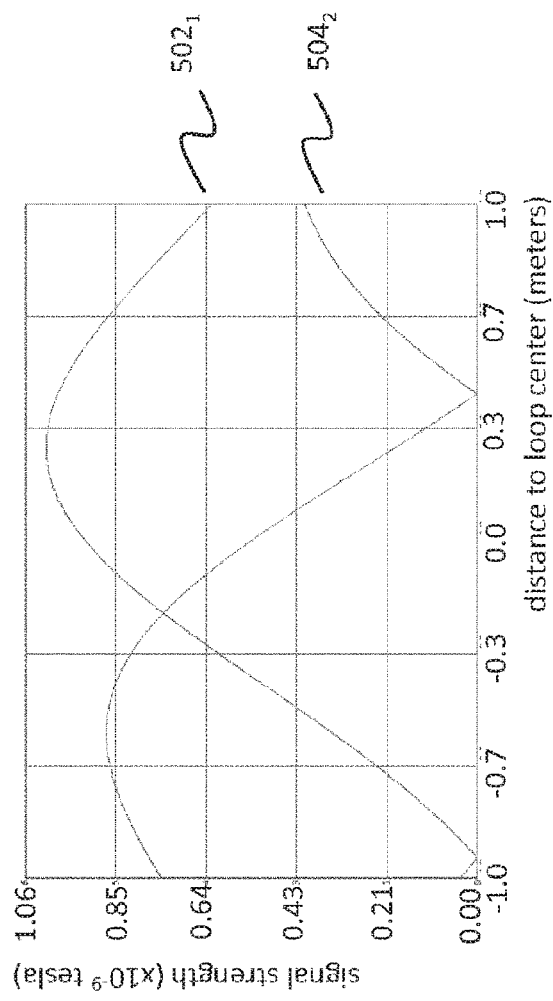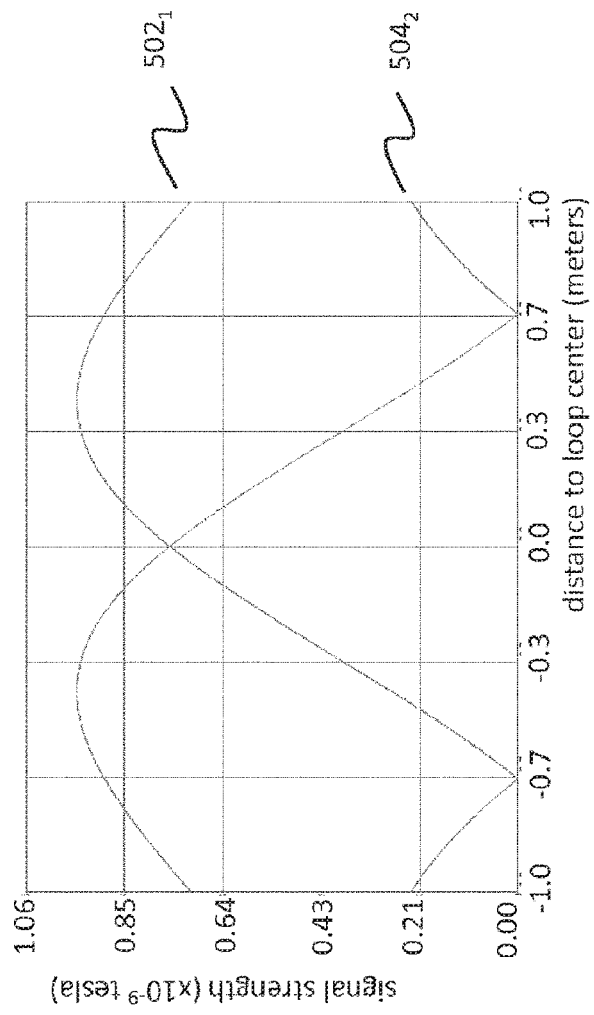
Fig. 5A
Fig. 5B

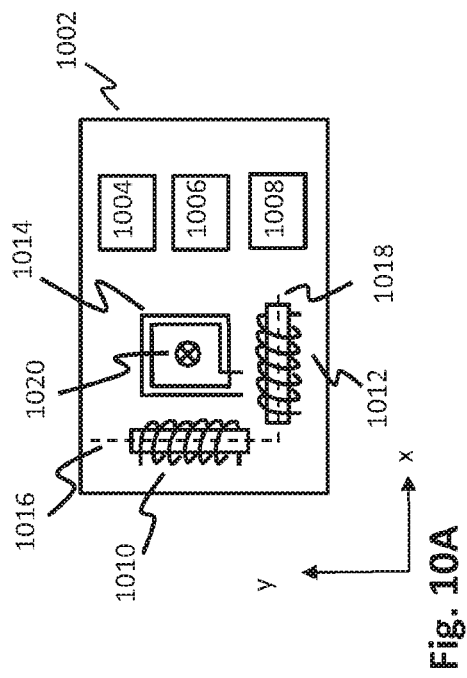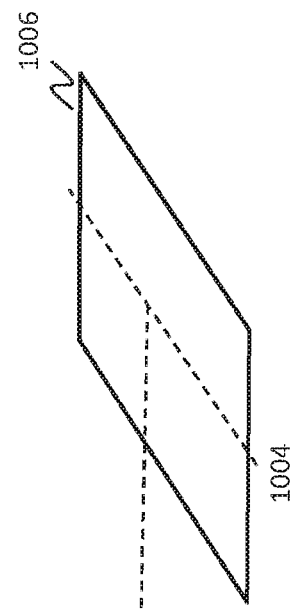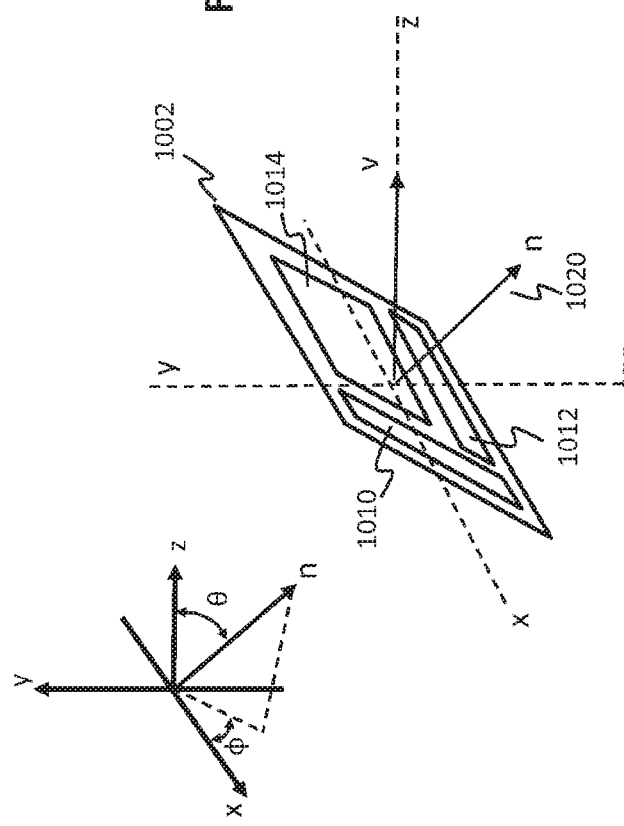
Fig. 10A
Fig. 10B

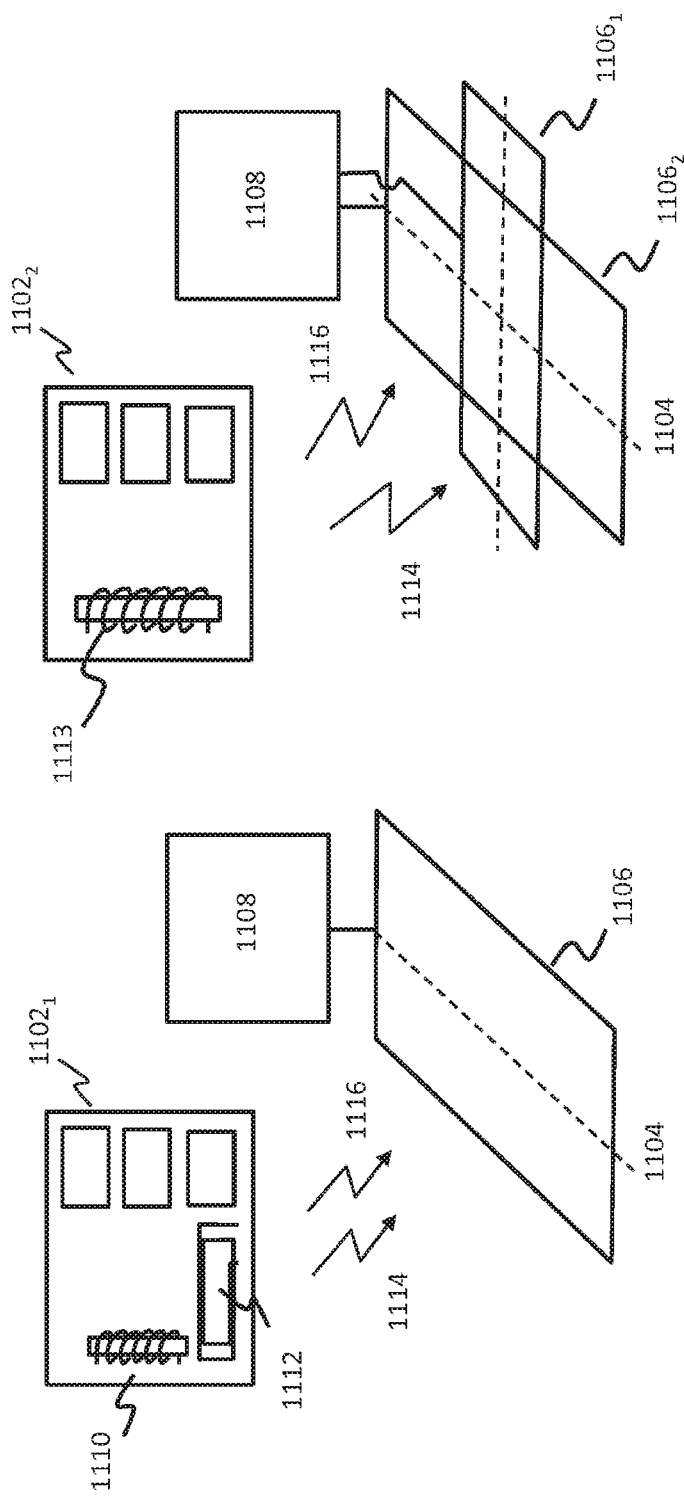

DETERMINING THE PASSING TIME OF A MOVING TRANSPONDER

CROSS-REFERENCE TO RELATED APPLICATION

The present application is a national stage of and claims priority of International patent application Serial No. PCT/EP2015/080352, filed Dec. 17, 2015, and published in English as WO 2016/016160 A2.

FIELD OF THE INVENTION

The discussion below is merely provided for general background information and is not intended to be used as an aid in determining the scope of the claimed subject matter.

The invention relates to determining the passing time of a transponder passing the detector antenna, and, in particular, though not exclusively, to a method and a system for determining the passing time of a moving transponder, a transponder for enabling a determination of a passing timing of a moving transponder, a timing module for determining the passing time of moving transponders passing a detection antenna of a base station, a transponder for enabling the passing time, and a computer program product for using such method.

BACKGROUND OF THE INVENTION

Sports events such as car- or motor racing, athletics and ice-skating, typically require accurate and fast time registration for tracking the participants during the event. Such timing system is usually based on a transmitter-detector based scheme, wherein each participant in the event is provided with a transmitter (a transponder). The transmitter may be configured to transmit packets at a certain frequency and to insert a unique identifier into the packet such that a detector is able to associate a packet with a certain transmitter.

Each time a transmitter passes a loop antenna of the detector, the detector may receive multiple data packets associated with the transmitter. The signal strength associated with a received data packet (the RSSI) is a function of distance of the transmitter relative to the antenna and the particular configuration of the transmitter- and detector antennae. Hence, by assigning time-stamp information and by evaluating the signal strength associated with each data packet, the detector may determine at what time the transponder passes the detector antenna.

In some systems for determining the passing time of a car of a bike, the transponder is mounted on the chassis or frame of the vehicle. In that case, the angle between the transponder and the loop detector embedded in the road is fixed and known, e.g. zero or 90 degree depending on the type of transponder. A simple implementation of a passing time algorithm is to find the time where the signal strength, e.g. the RSSI, is at a maximum or minimum.

However, in certain situations, e.g. when the transponder is worn by an athlete on the chest (e.g. a runner), the angle between the transponder and the loop may vary. The runner may finish leaning forward and/or sideward and so that the angle does not stay on a fixed predetermined angle. In that case, the algorithm that assumes a fixed angle will make a significant error in determining the passing timing. Hence, from the above it follows that there is a need in the art for improved timing systems that allow accurate determination of the passing time even when the angle between the transponder and the antenna is variable.

SUMMARY OF THE INVENTION

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In a first aspect, the invention may relate to a method of determining the passing time of a moving transponder passing a detection antenna of a base station.

In a first embodiment, the method may comprise: during said passing exchanging (a sequence of) first signals between a first transponder coil and said detection antenna and (a sequence of) second signals between a second transponder coil and the detection coil; associating said first and/or second signals with time instances indicating the time when said first and/or second signals are exchanged between said transponder and said base station; and, determining the passing time of said transponder on the basis of the signal strengths of said first and second signals and said time instances.

An accurate passing time is provided that is corrected for errors due to changes in the angular orientation of the transponder relative to the detection antenna. This correction is based on the signal strengths of two different signal sequences that are exchanged during the passing between the transponder and the base station. During this process, the signal strengths values may be time-stamped in order to link the values to a time line. The inventors found out that the signal strengths of two different signal sequences correlates with the angular orientation of the transponder coil relative to the detection antenna. Analysis of the signal strengths of the first and second sequence of signals that are exchanged during the passing of the transponder, allows a determination of the passing time that is corrected for the angular orientation of the transponder coil relative to the detection antenna. This way errors in the passing time can be eliminated or at least substantially reduced. Hence, the invention enables determination of a passing time that is more accurate than timing systems known from the prior art. The invention is simple and does not require additional hardware, e.g. an accelerometer or the like, in the transponder. Moreover, the invention does not depend on the speed at which the transponder passes the detection antenna.

In an embodiment, the direction of the magnetic axis of said first transponder coil differs from the direction of the magnetic axis of said second transponder coil. In another embodiment, the direction of the magnetic axis of said first transponder coil may be perpendicular to the direction of the magnetic axis of said second transponder coil. Hence, the first and second signals are exchanged between the transponder and the base stations on the basis of transponder coils that are oriented differently with respect to the detection antenna (typically a detection coil that is embedded in the track or over the track using e.g. a mat antenna.

In an embodiment, said passing time may be determined on the basis of at least one time instance associated with at least one maximum field strength value of said first signals and at least one time instance associated with at least one minimum field strength value of said second signals. Hence, extrema in the field strength values of the first and second signals may be used to accurately determine a passing time that is corrected for errors due to changes in the angular orientation of the transponder relative to the detection antenna.

In an embodiment, said time instances may indicate the time the first and/or second signals are received by said base station. In this embodiment, upon reception signals may be time-stamped by the base station in order to provide a time basis of the measures field strengths.

In an embodiment, said method may further comprise: using said first transponder coil for receiving said first signals transmitted by said detection antenna; and, using said second transponder coil for transmitting said second signals to said detection antenna, wherein said second signals comprise first signal strength values of said first signals. In this embodiment, the field strengths of the first signals received by the transponder are determined by the transponder In an embodiment, said method may further comprise: said transponder determining first signal strength values associated with said first signals. In another embodiment, said method may further comprise: if said signal strength values is above a predetermined threshold, said transponder determining second signals comprising said signal strength values for transmission to said detection antenna. In this embodiment, the transmitter unit in the transponder may be triggered if the signal strength of the signals transmitted by the base station are strong enough (i.e. the transponder is within a certain distance from the detection antenna).

In an embodiment, said method may further comprise: detecting said second signals; associating said second signals with second field strength values.

In an embodiment, said method may further comprise: said transponder using said first transponder coil for transmitting said first signals to said detection antenna; and, using said second transponder coil for transmitting said second signals to said detection antenna.

In an embodiment, said method may further comprise: detecting said first and second signals; associating said first and second signals with first and second field strength values respectively.

In an embodiment, said method may further comprise: determining at least a first time instance $T_1$ at which the signal strength of said first signals has at least one minimum signal strength value and at least a second time instance $T_2$ at which the signal strength of said second signals has at least one maximum signal strength value; determining a passing time $T_p$ by correcting $T_1$ or $T_2$ on the basis of a difference between $T_1$ and $T_2$.

In an embodiment, said first and/or second signals may comprise an identifier for identifying said transponder.

In a further aspect, the invention may relate to a timing system for determining the passing time of moving transponders passing at least one detection antenna of a base station, said system being configured for: during the passing of at least one transponder, exchanging a sequence of first signals between a first transponder coil and said detection antenna and a sequence of second signals between a second transponder coil and said detection coil; associating said first and/or second signals with time instances indicating the time when said first and/or second signals are exchanged between said transponder and said base station; and, determining the passing time of said at least one transponder on the basis of the signal strengths of said first and second signals and said time instances.

In yet a further aspect, the invention may relate to a base station configured for determining the passing time of moving transponders passing a detection antenna. In embodiment, said base station may be configured for: during the passing of at least one transponder, transmitting via said detection antenna a sequence of first signals to a first transponder coil and receiving a sequence of second signals transmitted by a second transponder coil to said detection antenna, said second signals comprising signal strength values of said first signals; associating said first and/or second signals with time instances indicating the time when said first and/or second signals are exchanged between said transponder and said base station; and, determining the passing time of said transponder on the basis of the signal strengths of said first and second signals and said time instances.

In another embodiment, said base station may be configured for: during the passing of at least one transponder, receiving a sequence of first signals transmitted by a first transponder coil and receiving a sequence of second signals transmitted by a second transponder coil; associating said first and/or second signals with time instances indicating the time when said first and/or second signals are exchanged between said transponder and said base station; and, determining the passing time of said transponder on the basis of the signal strengths of said first and second signals and said time instances.

In a further aspect, the invention may relate to a timing module for determining the passing time of moving transponders passing a detection antenna of a base station, wherein said module may be configured for: receiving first signal strength values associated with a sequence of first signals exchanged between at least one transponder and said base station; and, receiving second signal strength values associated with a sequence of second signals exchanged between at least one transponder and said base station; wherein said first and second strength values are associated with time instances at which said first and/or second signals are exchanged between said transponder and said base station; determining at least a first time instance $T_1$ at which the signal strength of said first signals has at least one minimum signal strength value and at least a second time instance $T_2$ at which the signal strength of said second signals has at least one maximum signal strength value; and, determining a passing time $T_p$ by correcting $T_1$ or $T_2$ on the basis of a difference between $T_1$ and $T_2$.

In yet another aspect, invention may relate to transponder for exchanging signals with a timing system that is configured for determine the passing time when the transponder passes a detection antenna of said timing system wherein said transponder may comprise: a detector unit using a first transponder coil for detecting first signals transmitted at a first carrier frequency by the timing system to said transponder; a transmitter unit using a second transponder coil for transmitting second signals at a second carrier frequency to the detection antenna; wherein the direction of the magnetic axis of said first transponder coil differs from the direction of the magnetic axis of said second transponder coil; and, wherein the direction of the magnetic axis of the first transponder coil is different from the direction of the magnetic axis of the second transponder coil.

In an embodiment, the first (carrier) frequency may be selected from a range between 10 and 1000 kHz, preferably between 50 and 250 kHz. In embodiment, the second (carrier) frequency may be selected from a range between 5 and 500 MHz. In another embodiment, the second (carrier) frequency may be selected from a range between 0.5 and 6 GHz.

The signal strength of signals that are exchanged between the transponder and the timing system will depend on the electromagnetic coupling between the transmitting transponder coil and the detection antenna. Hence, when the transponder moves towards the detection antenna, the electromagnetic coupling between the transponder coils and the detection coils—and hence the signal strength of the exchanged signals—will change as a function of the distance between the transponder and the detection antenna. This function, the distance function, can be used for accurately determining the passing time, i.e. the time instance the transponder passes the timing line. The distance function however also depends on the (angular) orientation of the transponder coil(s) with respect to the detection loop. Only for certain predetermined orientations of the transponder coil relative to the detection coil, maximum magnetic or minimal coupling with the detection antenna is achieved directly above the timing line. In that situation, the passing time can be determined by an algorithm that monitors the signal strength of the transponder signal during the passing and that detects at which time instance a minimum or maximum in the signal strength appeared. This time instance is then determined as the passing time.

In many situations however, the angular orientation of the transponder coil and the detection antenna deviates from the above-described ideal situation. The angular orientation is not fixed but variable and depends on orientation of the body of the athlete (or the orientation of the vehicle) when he or she (it) passes the timing line. Hence, in many situations, the position of the extrema in the signal strength signal no longer coincides with the passing of the transponder over the timing line.

The transponder enables determination of the passing time of transponders that different (angular) orientations with respect to the detection antenna. In particular, the transponder enables determination of the passing time for different transponder orientations due to the fact that the magnetic axis of the transponder coils are oriented in different directions so that—at a certain distance between the transponder and the detection antenna—the electromagnetic coupling between the transponder and the base station will be different.

The inventors found out that the distance functions associated with the first and second coil transponder coil correlates with the angular orientation of the transponder coil and the detection antenna. Hence, analysis of the signal strengths of the first and second sequence of signals that are exchanged during the passing of the transponder, allows a determination of the passing time that is corrected for the angular orientation of the transponder coil relative to the detection antenna. This way errors in the passing time can be eliminated or at least substantially reduced. Hence, the invention enables determination of a passing time that is more accurate than timing systems known from the prior art.

In an embodiment, the direction of the magnetic axis of said first transponder coil may be substantially perpendicular to the direction of the magnetic axis of said second transponder coil.

In an embodiment, said transponder may further comprises a transponder processor configured for measuring the signal strength of said second signals, for providing one or more data packets, for inserting one or more measured signal strength values of said second signals as payload in said one or more data packets and for providing said one or more data packets to said transmitter unit for transmitting first signals comprising said one or more data packets to said detection antenna.

In an embodiment, the sequence in which two or more signal strength values are inserted in the payload of at least one of said data packets is determined by the order in which the transponder has detected the first signals.

In an embodiment, the transponder processor may be configured to activate said receiver unit and/or said transmitter unit, if the signal strength of said second signals is above a predetermined signal strength threshold or if said second signals comprise a predetermined modulation pattern.

In a further aspect, the invention may relate to a sports bib comprising: a support sheet affixable to clothing and/or body for supporting a transponder, preferably said support sheet comprising a printed identifier on a front side of said support sheet; and, a transponder as described above. In an embodiment, said transponder may be attached to said support sheet such that one of the direction of the magnetic axis of the first or second transponder coil is substantially parallel to the plane of said support sheet and one of the magnetic axis of said first or second transponder coil is substantially perpendicular to the plane of said support sheet.

The invention may also relate to a computer program or suite of computer programs comprising at least one software code portion or a computer program product storing at least one software code portion, the software code portion, when run on a computer system, being configured for executing the method according to one or more of the above-described methods.

The aspects of the invention will be further illustrated with reference to the attached drawings, which schematically will show embodiments. It will be understood that the invention is not in any way restricted to these specific embodiments.

BRIEF DESCRIPTION OF THE DRAWINGS

FIGS. 3A and 3B depicts the signal strengths of a transponder that passes a detection antenna for a first angular orientation of the transponder coils with respect to the detection loop.

FIGS. 4A and 4B illustrate the signal strengths of a transponder that passes a detection antenna as a function of the distance between the transponder and the timing line for a particular coil configuration.

FIGS. 5A and 5B illustrate the signal strengths of a transponder that passes a detection antenna as a function of the distance between the transponder and the timing line for further coil configurations.

FIGS. 10A and 10B depicts a transponder—base station configuration according to an embodiment of the invention.

FIGS. 11A and 11B depict embodiments of a timing system that allows exchange of signals between the transponder and the base station on the basis of at least two different coil configurations.

DETAILED DESCRIPTION

Figure 1:
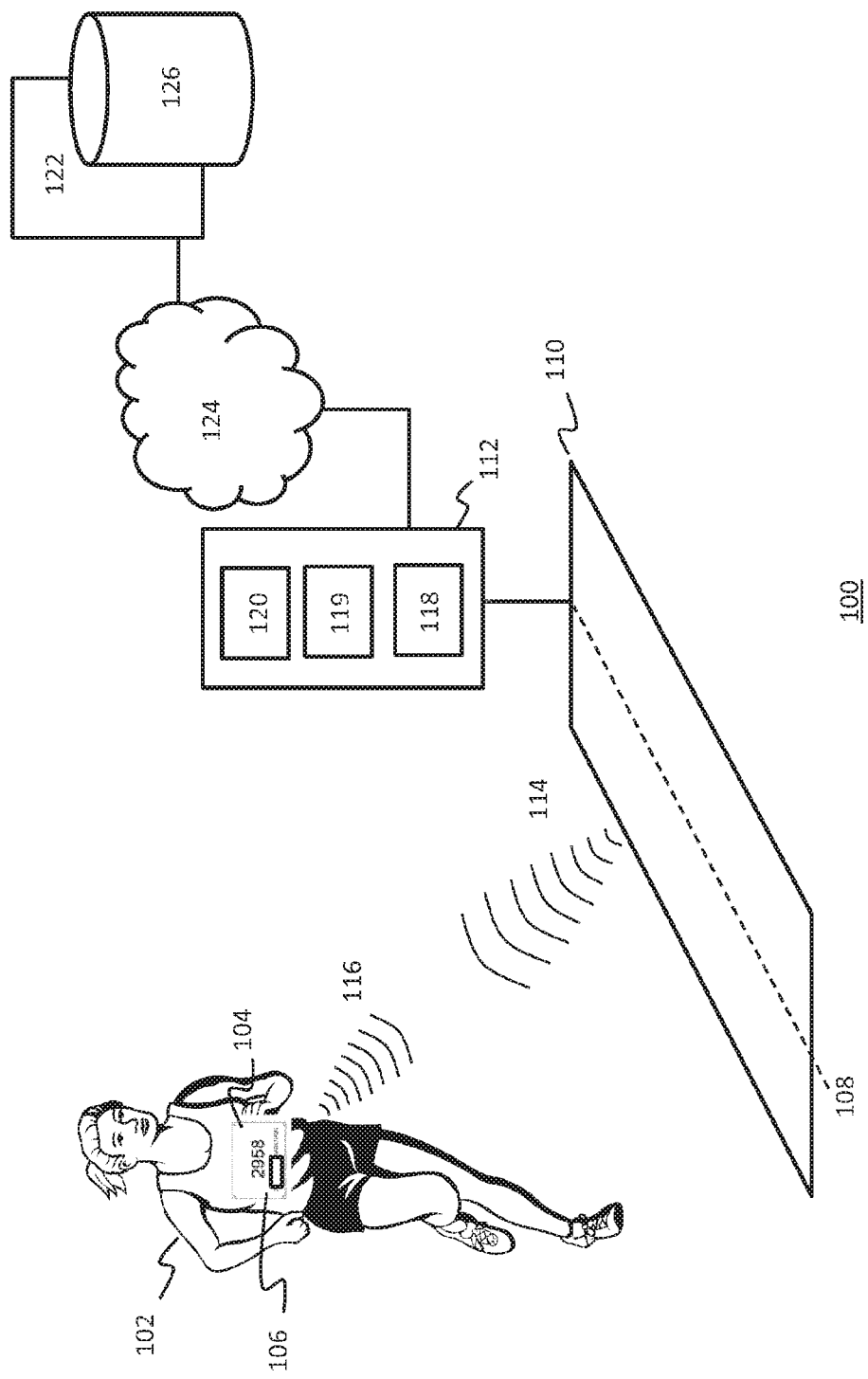
FIG. 1 schematically depicts a sports timing system according to an embodiment of the invention.

FIG. 1 schematically depicts a timing system according to an embodiment of the invention. In particular, FIG. 1 schematically depicts a timing system 100 that may be used for timing of moving transponders. For example, the timing system may be used in sporting events such as motor bike and bicycle races, marathons and triathlons etc. wherein participants 102 of an event may wear a transponders 106 that is associated with a unique identifier. In an embodiment, the transponder may be attached to the clothing or a bib 104 of the participant or the vehicle of the participant. A bib may comprise a support sheet affixable to clothing and/or body for supporting the transponder wherein the support sheet comprises a printed identifier on a front side of said support sheet.

The timing system may further comprise a base station 112 connected to one or more base detection antenna 110, e.g. one or more detection loops, which may be embedded in the ground or arranged over or next to the track. For example, in an embodiment, one or more detection loops may be implemented as a mat antenna. The detection antenna may be aligned with a timing line 108, e.g. a finish plane or the like, that is used as the reference mark at which the passing time, i.e. the time instance that a particular part of the participant passes (crosses) the timing line. The base station and the transponder may be configured to exchange signals in order to enable accurate determination of passing time.

To that end, the base station may comprise a receiver 118 for detecting transponder signals 116. In case of bidirectional communication between the transponder and the base station that base station may further comprise a transmitter 119 for transmitting base station signals 114 via the detection antenna or another antenna to the transponder. During the passing of a transponder over the timing line, the base station receiver may detect a sequence of transponder signals. The base station may further determine signal timing information, e.g. a reception time, and signal strength information associated with the received transponder signals. A base station processer 120 may determine a passing time on the basis of the transponder signals and the associated signal timing and signal strength information. Part of the data processing may be done remotely by a data processing module 122 hosted on a server. In that case, the base station may be configured to transmit the information via one or more networks 124 to a data processing module. A database 126 connected to the server may be used to store passing times for later use.

The signal strength of transponder signals that are received by the base station will depend on the electromagnetic coupling between the transmitting transponder coil and the detection antenna. Hence, when the transponder moves towards the detection antenna, the electromagnetic coupling between the transponder coils and the detection coils—and hence the signal strength of the detected transponder signal—will change as a function of the distance between the transponder and the detection antenna. This function, which hereafter may be referred to as the distance function, can be used for accurately determining the passing time, i.e. the time instance the transponder passes the timing line. The distance function however also depends on the (angular) orientation of the transponder coil(s) with respect to the detection loop. Only for certain predetermined angular orientations of the transponder coil relative to the detection coil, maximum magnetic or minimal coupling with the detection antenna is achieved directly above the timing line. In that situation, the passing time can be determined by an algorithm that monitors the signal strength of the transponder signal during the passing and that detects at which time instance a minimum or maximum in the signal strength appeared. This time instance is then determined as the passing time.

In many situations however, the angular orientation of the transponder coil and the detection antenna deviates from the above-described ideal situation. The angular orientation is not fixed but variable and depends on orientation of the body of the athlete (or the orientation of the vehicle) when he or she (it) passes the timing line. Hence, in many situations, the position of the extrema in the signal strength signal no longer coincides with the passing of the transponder over the timing line. The angular orientation of the transponder with respect to the detection loop may cause significant errors in the determined passing time. Hence, in order to guarantee accurate time measurements, a passing time algorithm is needed that takes the angular orientation of the transponder with respect to the detection antenna into account.

In order to enable correction of these angular effects, the timing system in FIG. 1 is configured to exchange—during the passing of transponder over the detection coil—a first and second sequence of signals wherein the first sequence of signals is exchanged on the basis of a first transponder coil/detection coil configuration (a first coil configuration) and the second sequence of signals is exchanged on the basis of a second transponder coil/detection coil configuration (a second coil configuration). In an embodiment, the coil configuration may be formed by two different transponder coils and a detection coil connected to the base station. For example, the first coil configuration may comprise a first transponder coil and a detector coil and the second coil configuration may comprise a second transponder coil and the detector coil wherein the magnetic axis of the first and second transponder coils have different orientations. Based on the signal strengths of the first and second sequence of signals that are exchanged during the passing of the transponder, a passing time can be determined that is corrected for the angular orientation of the transponder coil relative to the detection antenna. This way errors in the passing time can be eliminated or at least substantially reduced. The details of the timing system will be described hereunder in more detail.

Figure 2:
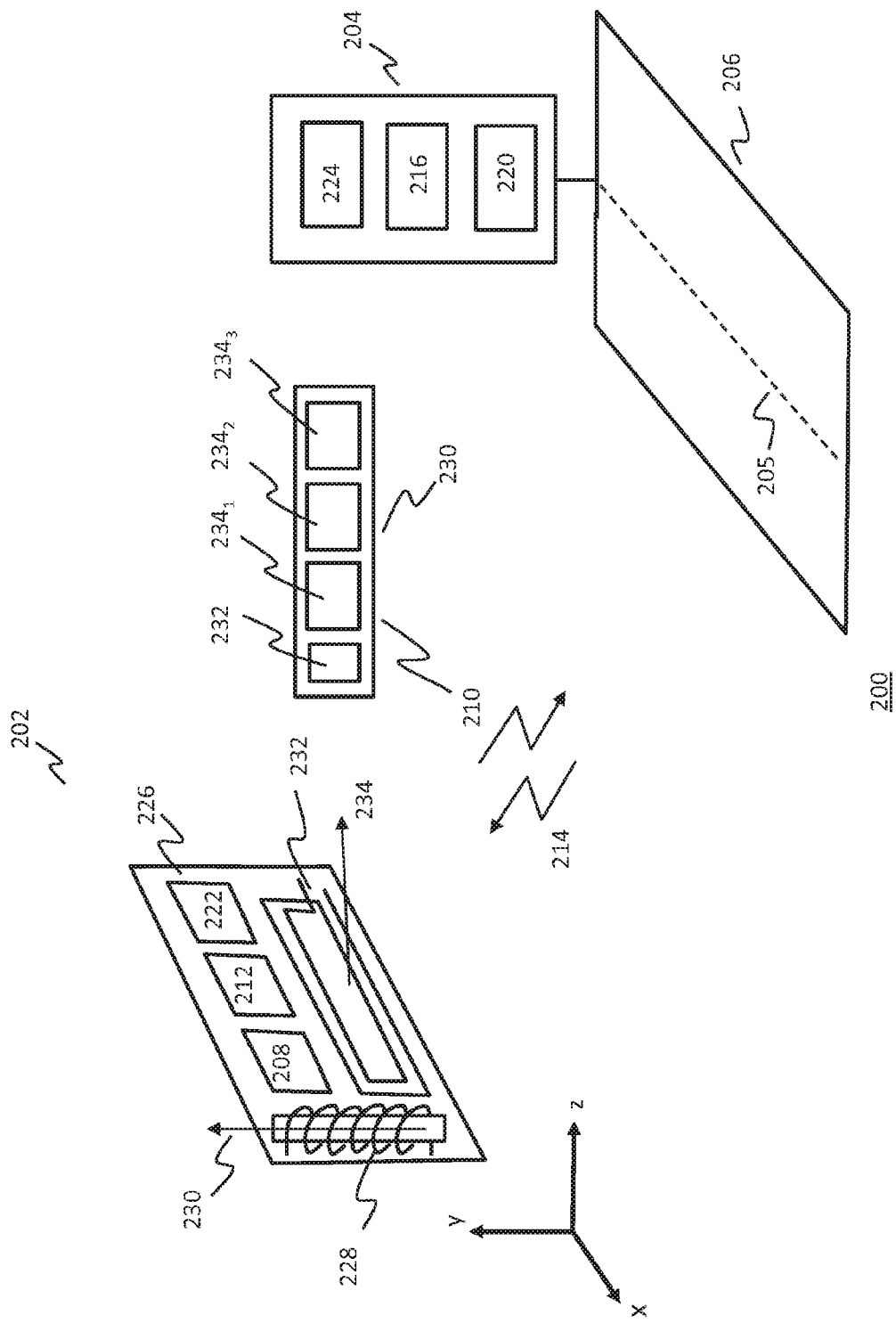
FIG. 2 depicts a schematic of at least part of a timing system according to an embodiment of the invention.

FIG. 2 depicts a schematic of at least part of a timing system according to an embodiment of the invention. In particular. FIG. 2 depicts a transponder module 202 and a base station 204 connected to a detection antenna 206, e.g. detection loop, wherein the detection antenna may be aligned with a timing line 205 (e.g. parallel to the y-axis). In this particular embodiment, the timing system is configured for bidirectional data exchange between the transponder and the base station. To that end, the transponder may comprise a transmitter unit 208 for transmitting first (transponder) signals 210 comprising data packets 230 to a base station and a receiver unit 212 for receiving second (base station) signals 214 from the base station. Similarly, the base station may comprise a receiver unit 216 for receiving signals from transponders that are within the range of the detection antenna and a transmitter unit 220 for transmitting transponder signals to the transponder. The base station may comprise a (real time) clock such that the received and/or transmitted signals may be time-stamped upon receipt or transmission.

The transponder may comprise a power source in the form of a battery or the like. In an embodiment, the receiver unit of the transponder may be implemented as a low-power wake-up receiver such that the receiver unit will be activated only in case it receives a wake-up signal. This way, the life of the power source may be substantially extended. In an embodiment, the wake-up signal may be a signal that has a predetermined carrier frequency and a signal strength wherein the signal strength is above a predetermined signal strength threshold value. In another embodiment, the wake-up signal may be a base station signal that has a predetermined carrier frequency and a predetermined modulation pattern. The predetermined modulation pattern may be used for distinguishing the carrier frequency from the surrounding white noise.

A processor 222,224 in the transponder and the base station may be configured to control the transmitter and receiver units in order to transmit and receive (exchange) signals on the basis of a suitable data transmission scheme. Examples of such data transmission schemes may include a quadrature amplitude modulation (QAM), frequency shift keying (FSK), phase shift keying (PSK) and amplitude shift keying (ASK). To that end, the processor in the transponder and base station may be configured to generate data packets of a certain data format that complies with the data transmission scheme. A data packet may comprise a header and a payload. The header information may comprise a (unique) transponder identifier so that a receiver, e.g. the receiving unit in the base station, is able to link a transponder signal comprising one or more data packets to a particular transponder. The processor in the transponder and the base station may further comprise a modulator for transforming data packets in a RF data signal and a demodulator for transforming RF data signals received by the detection unit of the transponder into data packets. A decoder in the processor may extract information from data packets, e.g. the header information and/or the payload, which may be used by a passing time algorithm in the determination of the passing time. In order to avoid collisions an anti-collision scheme, e.g. a TDMA scheme, may be used. Typical transmission periods are within the range of 1 and 10 ms and typical data signal lengths may be within a range between 50 and 300 µs.

The transponder may further comprise at least two magnetic coils arranged on a planar substrate 226 defining a transponder plane. A first (receiver) coil 228 may be connected to the receiver unit of the transponder wherein the first coil has a magnetic axis 230 in a first direction (e.g. in the transponder plane). The first receiver coil and the detection coil may form a first coil configuration for exchanging signals between the transponder and the base station. A second (transmission) coil 232 connected to the transmitter unit of the transponder may have its magnetic axis 234 in a second direction (e.g. perpendicular to the transponder plane). The second transponder coil and the detection coil may form a second coil configuration for exchanging signals between the transponder and the detection coil. The coils may be implemented in various ways, e.g. as a dipole-type thin-film or wire-wound coil (either with or without a ferrite core). The distance function will depend on the type of antenna that is used by the transponder.

The transmitter unit of the base station may transmit the transponder signals at a first (carrier) frequency, e.g. 125 kHz (the wake-up frequency of the receiver unit of the transponder) however other frequencies however are also envisaged. For example, in an embodiment, the first (carrier) frequency may be selected from a range between 10 and 1000 kHz, preferably between 50 and 250 kHz. When an athlete moves towards the timing line, the transponder will move towards the transmitting detection coil so that the transponder coil may start picking up base station signals at the first carrier frequency. The transponder process may determine the signal strength of the received base station signals and if the signal strength is above the signal strength threshold value it may start storing signal strength values of detected base station signals in a buffer. Further, the transponder processor may switch the transmitter unit from a sleeping mode into an active mode. During the active mode, the transponder processer may generate data packets of a predetermined data format and transmit these data packets in transponder signals to the base station.

In an embodiment, the transponder signals may be transmitted to the base station at a second (carrier) frequency. e.g. 6.78 MHz, that is different from the first carrier frequency. Other frequencies however are also envisaged. For example, in an embodiment, the second (carrier) frequency may be selected from a range between 5 and 500 MHz. Alternatively, the second (carrier) frequency may be selected from a range between 0.5 and 6 GHz. The transponder processor may generate data packets comprising a header 232 comprising—amongst others—an transponder ID for enabling the base station to identify the origin of a data packet. Further, the transponder process may insert one or more signal strength values $234_{1-3}$ of detected base station signals in the payload of the data packets. In an embodiment, a data packet that is sent in a transponder signal to the base station may comprise one signal strength value. In another embodiment, the data packet may comprise two, three, four or a plurality of signal strength values. The sequence in which the signal strength values are inserted in the payload of a data packet may determine the sequence in which the transponder has detected the base station signals.

In an embodiment, the transponder processor may start a counter when the detector unit of the transponder determines that the signal strength of the received base station signals is above a certain threshold. The counter may be increased or decreased until a certain end-value is reached. During the counting, the transponder may transmit transponder signals. When the counter reaches its end value, the transponder processor may turn the transmitter unit in the transponder back to its sleeping mode. Thereafter, the transponder processor may activate the transmitter unit in case it still receives base station signals that have a signal strength above the threshold. The counter thus ensures that that the transmitter unit is switched after a predetermined time. This way, the transmitter unit is only in the active mode when the base station signals are above a predetermined signal strength threshold, i.e. within a certain range of the detector antenna.

When the base station detects the transponder signals, it will determine the signals strength, e.g. the RSSI, of received transponder signals, convert the signals into digital data packets comprising one or more signal strength values as payload and assign timestamps to the data packets.

The signal strength of transponder signals that are received by the base station will depend on the electromagnetic coupling between the transmitting transponder coil and the detection antenna. When the transponder moves towards the detection antenna, the electromagnetic coupling—and hence the signal strength of the detected transponder signal—will change as a function of the distance between the transponder and the detection antenna. The signal strengths of the base station signals (transmitted by the detection coil and received by the first (receiving) coil of the transponder) and the signal strengths of the (time stamped) transponder signals (transmitted via the second (transmitter) coil and received by the base station) that are determined during the passing of the transponder over the detection coil are used to accurately determine the passing time of the transponder.

FIGS. 3A and 3B depicts measured signal strengths of a transponder that passes a detection antenna for a particular orientation of the transponder coils with respect to the detection loop. In particular, FIGS. 3A and 3B depicts a situation wherein the angular orientation of the transponder coil relative to the detection coil provides maximum magnetic or minimal coupling with the detection antenna when the transponder is located above the timing line. FIG. 3A depicts the orientation of the transponder with respect to the detection coil in more detail. The transponder 302 moves with a certain velocity v in the direction of the z-axis towards the detection coil. Ideally the transponder plane is oriented in the x,y plane and the detection coil is arranged in the x,z plane wherein the longitudinal side of the detection coil being substantially parallel to the z-axis (and the timing line). In the transponder configuration of FIG. 3A, the magnetic axis of the first transponder coil 308 is parallel to the y-axis and the magnetic axis of the second transponder coil 310 is parallel to the z-axis.

FIG. 3B depicts a plot of the signal strengths values that are exchanged between the first transponder coil 308 and the detection coil 306 (signal strengths values denoted by a circle) and the second transponder coil 310 and the detection coil 306 (signal strength values denoted by a triangle) versus the distance between the transponder and the timing line (wherein zero corresponds to a position on the timing line). It is noted that although the x-axis mentions distance between the transponder and the timing line, it actually represents a time measured by the base station, in particular the time that the transponder signals are received by the base station.

FIG. 3B shows that for this transponder configuration, the electromagnetic coupling between the first transponder coil 308 and the detection coil 306 may be given by a first distance function 322 wherein the signal strength exhibits a maximum 322 when the transponder is positioned above the timing line and minima (not shown) at positions when the transponder is positioned above a part of the coil is oriented parallel to the timing line. In contrast, the electromagnetic coupling between the second transponder coil 310 and the detection coil 306 is given by a second distance function 314 which exhibits a minimum signal strength 322 when the transponder is positioned above the timing line and minima (not shown) at positions when the transponder is positioned above a part of the coil is oriented parallel to the timing line.

Hence, by measuring the signal strengths of signals that are exchanged between the first transponder coil and the base station and the second transponder coil and the base station, both distance functions can be obtained. The measured signal strengths can be associated with a time by time-stamping the signals that are exchanged between the transponder and the base station so that the time-instance associated with minimum in the first distance function and/or maximum in the second distance functions can be determined as a passing time. As already mentioned above, FIGS. 3A and 3B depict the ideal case wherein maximum/minimum coupling between the transponder coils and the detection coils is realized when the transponder is above the timing line. However, when an athlete passes the timing line, there is a large chance that the orientation, in particular the orientation of the transponder coils with respect to the detection loop does not correspond to the situation depicted in FIGS. 3A and 3B.

FIGS. 4A and 4B illustrate signal strengths of a transponder that passes a detection antenna as a function of the distance between the transponder and the timing line wherein the orientation of the transponder coils with respect to the detection loop differs from the situation illustrated in FIGS. 3A and 3B. In particular, FIG. 4A depicts a situation similar to the one of FIG. 3A with the exception that the transponder 402 comprising a first coil 408 and second coil 410 is rotated over an angle θ 418 of 15 degrees about the x-axis (i.e. the angle between the normal n 416 of the transponder plane and the z-axis is θ). This rotation will result in distance functions that are different from the ones shown in FIG. 3B. As shown in FIG. 4B, rotation of the transponder about the x-axis will result in first and second distance functions 418,422 wherein the maximum signal strength 420 of the first distance function and the minimum signal strength 424 of the second distance function no longer coincide with a transponder position above the timing line. FIGS. 4A and 4B show that deviations from the "ideal" transponder orientation as shown in FIGS. 3A and 3B will cause an error in the determination of the passing time.

FIGS. 5A and 5B show first and second distance functions $502_{1,2}, 504_{1,2}$ for further angular orientations between the transponder coils and the detection coil, i.e. 30 degrees resp. 45 degrees rotation of the transponder about the x-axis. As shown in this figures, the rotation will cause a further shift in the position of the extrema in the signal strength with respect to the position of the timing line and with respect to each other. The functional relation of the position of the extrema of the two distance functions thus correlate with the position of the transponder coils relative to the detection coil. This correlation is described in more detail with reference to FIGS. 6 and 7A and 7B and can be used in an passing time algorithm for accurate determination of a passing time that is corrected for (angular) deviations in the orientation of the transponder coils with respect to the detection loop.

Figure 6:
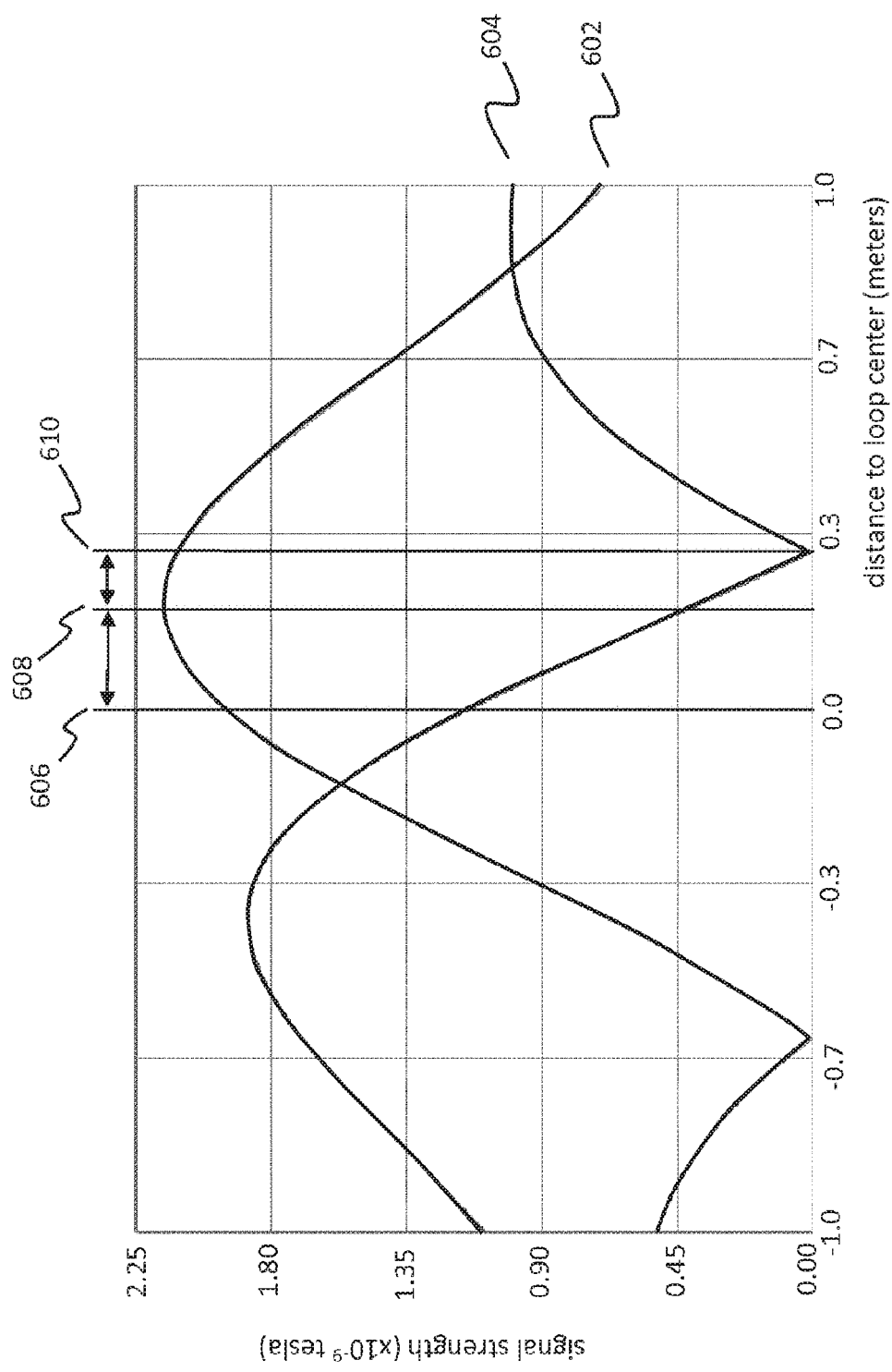
FIG. 6 illustrate the signal strengths of a transponder that passes a detection antenna as a function of the distance between the transponder and the timing line for a particular coil configuration and the signal strength values that are used for determining the passing time.

FIG. 6 depicts a first and second distance function 602, 604 that are similar to those described with reference to FIG. 4B. Hence, during the passing of a transponder over the detection coil, the timing system may measure the signal strength of a first and second sequence of signals that are exchanged between the transponder and the base station. On the basis of the measured signal strength values a first and second distance function may be derived which are used by the passing time algorithm in order to determine a passing time. The passing time algorithm may comprise the steps of determining:
 a first time instance $T_1$ at which a first distance function 602 has a minimum signal strength value 610;
 a second time instance $T_2$ at which the second distance function 604 has a maximum signal strength value 608;
 a parameter delta Δ defined as a difference between $T_1$ and $T_2$;
 A passing time $T_p$ by calculating $T_1 - \Delta*K$, wherein K is a constant that depends on the height of the transponder and the loop width.

Figure 7A:
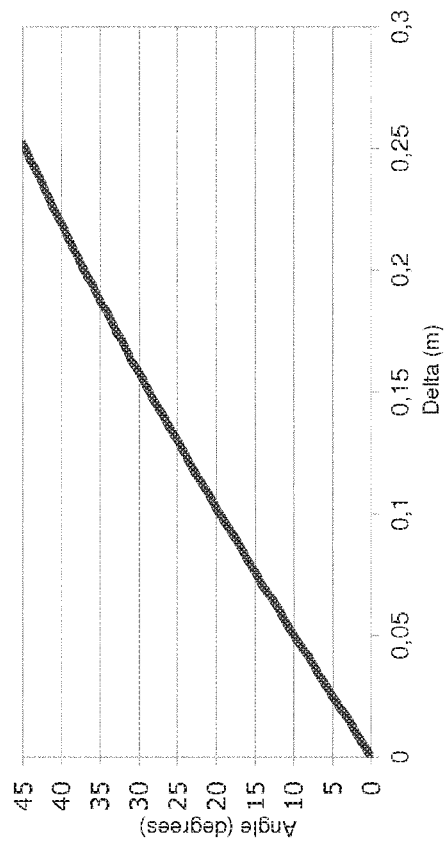
FIGS. 7A and 7B depict the relation of delta Δ and the angular orientation of the transponder plane and linear relation between delta and the error that is introduced by the angular orientation of the transponder plane.
Figure 7B:
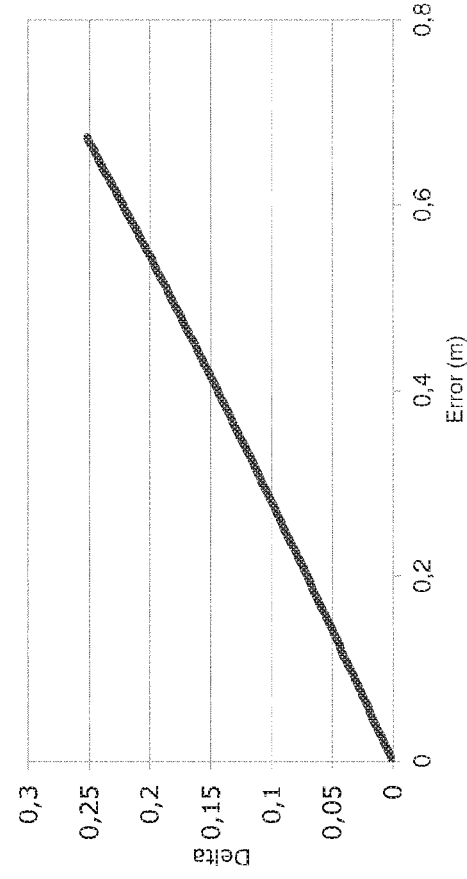

The loop width may be a fixed parameter of about 50 to 100 cm. The transponder height is a system parameter, which is estimated to be approximately 150 cm. FIG. 7A depicts the relation of delta Δ en the angular orientation of the transponder plane. This graphs shows that the difference between the position of the maximum signal strength of the first distance function and the position of the minimum signal strength of the second distance function correlates with the angular orientation of the transponder plane in a substantial linear way. Further, FIG. 7B depicts the substantially linear relation between delta and the error that is introduced by the angular orientation of the transponder plane. Hence, when angular orientation of the transponder plane increases, the error increases.

Figure 8:
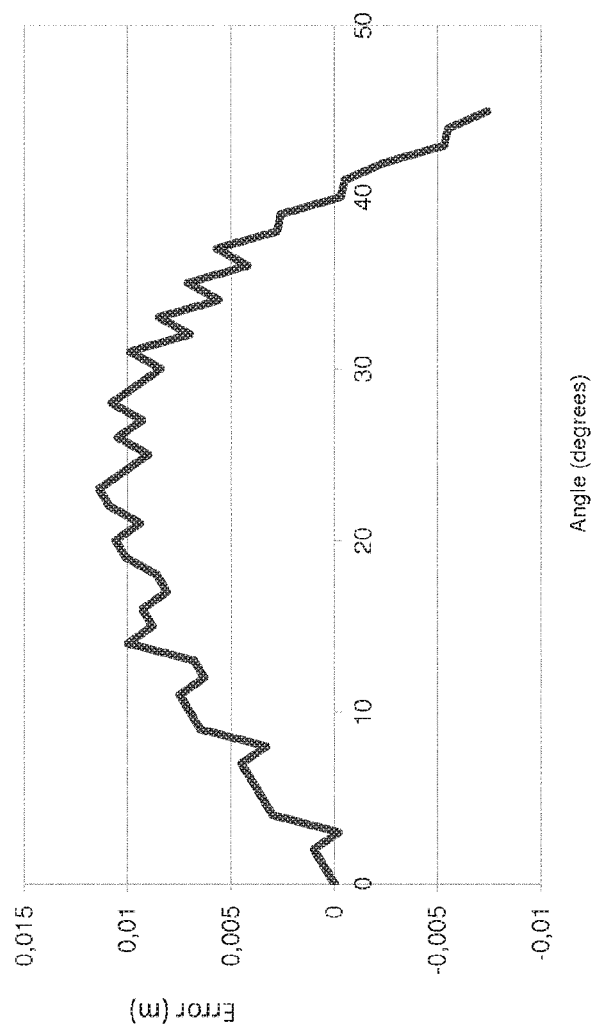
FIG. 8 shows the error of the passing time as a function of the angle.

The passing time algorithm may use $T_1$ as the initial passing time and correct this time value with K times the delta value. For example in FIG. 7A the passing time may be determined as: $T_p=T_1-\Delta*2.7$. FIG. 8 shows the error of the passing time as a function of the angle. This graph shows that the error in the position of the timing line due to angular effects can be kept very low. Moreover, the algorithm is speed independent. Although in the above-mentioned passing time algorithm the passing time is determined on the basis of $T_1$, it is clear for the skilled person that also $T_2$ could be used as a basis for determining the passing time.

Figure 9:
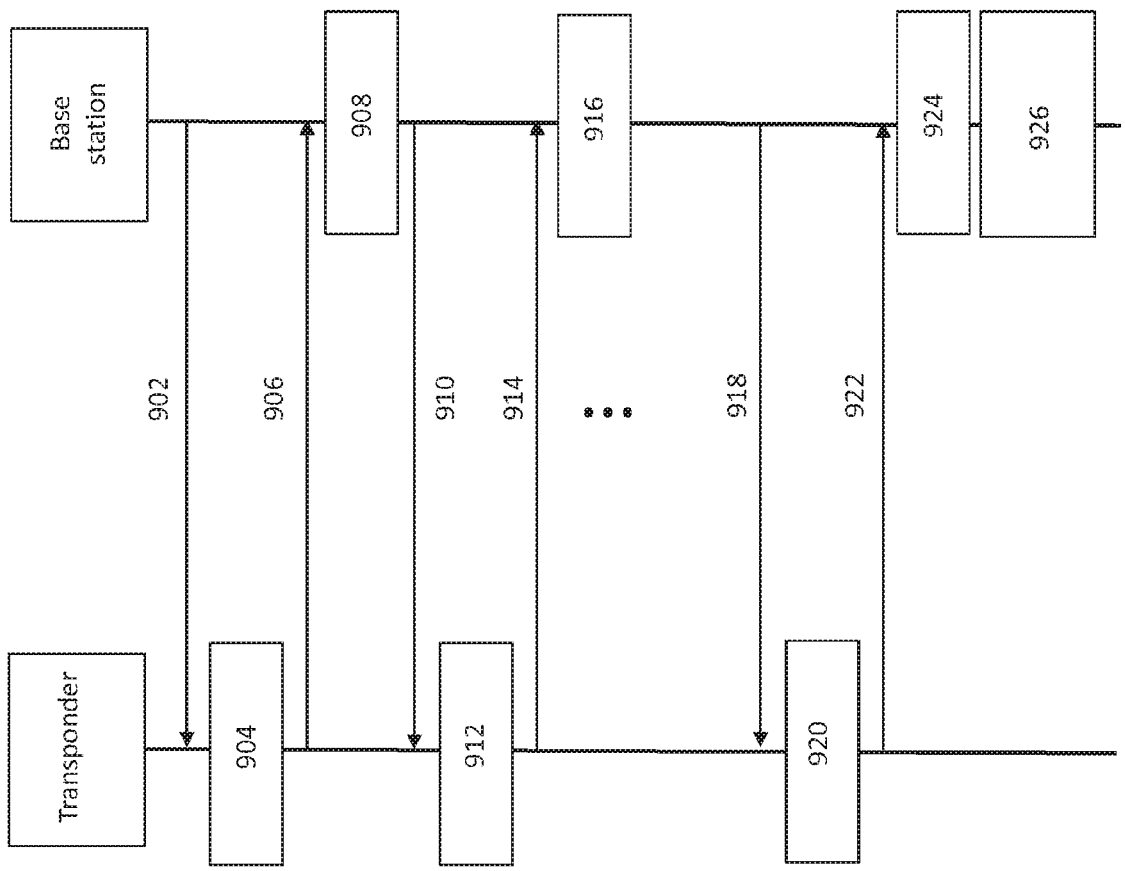
FIG. 9 depicts a flow diagram of a processes for determining the passing time of a moving transponder according to an embodiment of the invention.

FIG. 9 depicts a flow diagram of a processes for determining the passing time of a moving transponder according to an embodiment of the invention. Here, the process may start with the base station transmitting base station signals to the transponder (step 902) at a first (carrier) frequency. When the detector is within range of the base station, the transponder may detect the base station signals and if the signal strength of the base station signal is above a certain threshold and/or a certain modulation pattern is detected (step 904), the transponder may be triggered to send a transponder signal to the base station at a second (carrier) frequency, wherein the transponder signal comprises an transponder identifier and the signal strength of the base station signal (step 906). The transponder signal comprising the signal strength and the transponder ID may be detected by the bases station. Upon detection, the base station may determine the signal strength of the received transponder signal and the reception time of the transponder signal (step 908). Process steps 902-908 may be repeated as long as signal strength of the base station signal received by the transponder is above the threshold (steps 910-924). This way, the signal strengths of a sequence of first signals (the signal strength of the base station signals) and the signal strengths of a sequence of second signals (the signal strength of the transponder signals) may be determined. This signal strengths may define first and second distance functions which can be used by the time passing algorithm in for determining a passing time that is corrected for angular orientations of the transponder relative to the detection antenna.

FIGS. 10A and 10B depicts a transponder—base station configuration according to another embodiment of the invention. In particular, FIG. 10A depicts a transponder 1002 comprising a processor 1004 and a receiver unit 1006 and transmitter unit 1008. The transponder further comprises three magnetic coils 1010,1012,1014 wherein the magnetic axis of each coil 1016,1018,1020 is oriented in a different direction (e.g. a first coil with a magnetic axis in the y direction, a second coil with a magnetic axis in the x direction and a third coil with its magnetic axis in the z direction).

As depicted in FIG. 10B, the orientation of the transponder plane relative to the x,y and z-axis can be described on the basis of spherical coordinates, including an inclination angle $\theta$ and an azimuthal angle $\varphi$, wherein the inclination angle is defined with respect to the z-axis (the axis normal to the (top) surface of the wavelength conversion layer) and wherein the azimuthal angle $\varphi$ is defined with respect to the x or y axis. When the transponder moves towards the detection antenna, the electromagnetic coupling between each of the transponder coils and the detection coils will change as a function of the distance between the transponder and the detection antenna. The three differently oriented coils may correct for angular deviations in two angular directions $\theta$ and $\varphi$ using a similar scheme as described in detail with reference to FIG. 1-9 above.

It is submitted that the process of determining signal strengths of a first sequence of signals exchanged between the transponder and the base station on the basis of a first coil configuration (e.g. a first transponder coil and the detection coil) and a second coil configuration (e.g. a second transponder coil and the detection coil) can be implemented in various ways. For example, FIGS. 11A and 11B depict embodiments of a timing system that allows exchange of signals between the transponder and the base station on the basis of at least two different coil configurations. For example, in the embodiment of FIG. 11A first and second signals 1114,1116 may be exchanged between the transponder $1102_1$ and the base station 1108 using two alternatingly transmitting transponder coils 1110,1112 wherein the direction of the magnetic axis of the first transmitting transponder coil and the direction of the magnetic axis of the second transmitting transponder coil have a different orientation. Hence, during the passing of the moving transponder over the timing line, the transponder is transmitting a sequence of first and second signals that are detected by the detection antenna 1106 once the transponder comes within reach of the detection antenna. The base station 1108 may detect the first and second signals, determine their signal strength and determining time instances indicating at which time the signals were received by the base station. A passing time algorithm in the base station may subsequently calculate the passing time on the basis of the signal strengths and associated time instances.

FIG. 11B depicts a further embodiment, wherein first and second signals 1114,1116 may be exchanged between the transponder $1102_2$ and the base station 1108 using one transponder coil 1113 and at least two differently oriented detection antennas $1106_{1,2}$. Hence, during the passing of the moving transponder over the timing line, the transponder may alternatingly receive a first signal transmitted by the first detection antenna $1106_1$, determine the signal strength of the received first signal and subsequently transmit a second signal to the second detection antenna $1106_2$ wherein the second signal comprises a signal strength value of the associated first signal. The base station 1108 may detect the second signals, determine their signal strength and determining time instances indicating at which time the second signals were received by the base station. A passing time algorithm in the base station may subsequently calculate the passing time on the basis of the signal strength values of the first and second signals and associated time instances.

Figure 12:
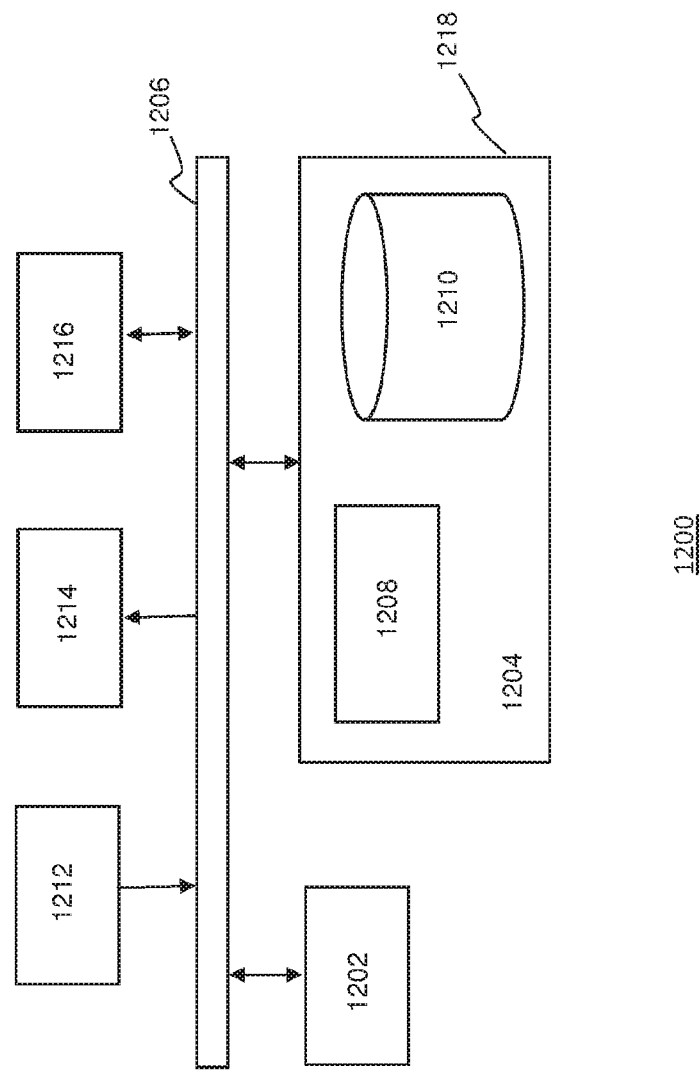
FIG. 12 depicts a block diagram illustrating an exemplary data processing system that may be used in systems and methods as described in this application.

FIG. 12 depicts a block diagram illustrating an exemplary data processing system that may be used in systems and methods as described with reference to FIG. 1-11. The data processing system 1200 may include at least one processor 1202 coupled to memory elements 1204 through a system bus 1006. As such, the data processing system may store program code within memory elements 1204. Further, processor 1202 may execute the program code accessed from memory elements 1204 via system bus 1256. In one aspect, data processing system may be implemented as a computer that is suitable for storing and/or executing program code. It should be appreciated, however, that data processing system may be implemented in the form of any system including a processor and memory that is capable of performing the functions described within this specification.

Memory elements 1204 may include one or more physical memory devices such as, for example, local memory 1208 and one or more bulk storage devices 1210. Local memory may refer to random access memory or other non-persistent memory device(s) generally used during actual execution of the program code. A bulk storage device may be implemented as a hard drive or other persistent data storage device. The processing system may also include one or more cache memories (not shown) that provide temporary storage of at least some program code in order to reduce the number of times program code must be retrieved from bulk storage device 1210 during execution.

Input/output (I/O) devices depicted as input device 1212 and output device 1214 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1216 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system.

As pictured in FIG. 12, memory elements 1204 may store an application 1218. It should be appreciated that data processing system 1200 may further execute an operating system (not shown) that can facilitate execution of the application. Application, being implemented in the form of executable program code, can be executed by data processing system 1200, e.g., by processor 1202. Responsive to executing application, data processing system may be configured to perform one or more operations to be described herein in further detail.

In one aspect, for example, data processing system 1200 may represent a client data processing system. In that case, application 1218 may represent a client application that, when executed, configures data processing system 1200 to perform the various functions described herein with reference to a "client". Examples of a client can include, but are not limited to, a personal computer, a portable computer, a mobile phone, or the like.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of determining a passing time of a moving transponder passing a detection antenna of a base station, the transponder including a first transponder coil and a second transponder coil, wherein a direction of a magnetic axis of said first transponder coil differs from a direction of a magnetic axis of said second transponder coil, the method comprising:
   during said passing, exchanging a sequence of first signals between the first transponder coil and said detection antenna and a sequence of second signals between the second transponder coil and the detection antenna;
   associating said first and/or second signals with time instances indicating a time when said first and/or second signals are exchanged between said transponder and said base station; and
   determining the passing time of said transponder with respect to the detection antenna on a basis of applying a correction based on a time difference of selected characteristics occurring in the signal strengths of said first and second signals as the first and second transponder coils pass by the detection antenna.

2. The method according to claim 1, wherein said passing time is determined on a basis of at least one time instance associated with at least one maximum field strength value of said first signals exchanged between the first transponder coil and said detection antenna and at least one time instance associated with at least one minimum field strength value of said second signals exchanged between the second transponder coil and the detection antenna.

3. The method according to claim 2 further comprising:
   detecting said second signals; and,
   associating said second signals with second field strength values.

4. The method according to claim 1 further comprising:
   using said first transponder coil for receiving said first signals transmitted by said detection antenna; and,
   using said second transponder coil for transmitting said second signals to said detection antenna, wherein said second signals comprise first signal strength values of said first signals.

5. The method according to claim 4 further comprising:
   determining first signal strength values associated with said first signals;
   inserting one or more of said first signal strength values as payload in data packets; and,
   transmitting second signals comprising said data packets to said detection antenna.

6. The method according to claim 1 further comprising:
   said transponder using said first transponder coil for transmitting said first signals to said detection antenna; and,
   using said second transponder coil for transmitting said second signals to said detection antenna.

7. The method according to claim 1 further comprising:
   detecting said first and second signals; and,
   determining first field strength values associated with a strength of said first signals and second field strength values associated with a strength of said second signals.

8. The method according to claim 1 further comprising:
   determining at least a first time instance T1 at which a signal strength of said first signals exchanged between the first transponder coil and said detection antenna has at least one minimum signal strength value and at least a second time instance T2 at which a signal strength of said second signals exchanged between the second transponder coil and the detection antenna has at least one maximum signal strength value; and, determining a passing time $T_p$ by correcting $T_1$ or $T_2$ on the basis of $T_1$ and $T_2$.

9. A non-transitory computer readable storage medium having stored thereon a computer program or suite of computer programs comprising at least one software code portion or a computer program product storing at least one software code portion, the software code portion, when run on a computer system, being configured for executing the method according to claim 1.

10. The method of claim 1 wherein said time instances indicate the time at which the first and/or second signals are received by said base station.

11. The method of claim 1 wherein the direction of the magnetic axis of said first transponder coil being substantially perpendicular to the direction of the magnetic axis of said second transponder coil.

12. A timing system for determining a passing time of moving transponders passing at least one detection antenna of a base station, said timing system being configured for:
during the passing of at least one transponder, the at least one transponder comprising a first transponder coil and a second transponder coil, exchanging a sequence of first signals between the first transponder coil and said at least one detection antenna and a sequence of second signals between the second transponder coil and said at least one detection antenna wherein a direction of a magnetic axis of said first transponder coil differs from a direction of a magnetic axis of said second transponder coil;
associating said first and/or second signals with time instances indicating a time when said first and/or second signals are exchanged between said at least one transponder and said base station; and,
determining the passing time of said at least one transponder with respect to the detection antenna on a basis of applying a correction based on a time difference of selected characteristics occurring in the signal strengths of said first and second signals as the first and second transponder coils pass by the detection antenna.

13. A base station for determining a passing time of moving transponders passing a detection antenna, said base station being configured for:
during the passing of at least one transponder, the at least one transponder comprising a first transponder coil and a second transponder coil, transmitting via said detection antenna a sequence of first signals to the first transponder coil and receiving a sequence of second signals transmitted by the second transponder coil to said detection antenna, wherein a direction of a magnetic axis of said first transponder coil differs from a direction of a magnetic axis of said second transponder coil, said second signals comprising signal strength values of said first signals;
associating said first and/or second signals with time instances indicating a time when said first and/or second signals are exchanged between said at least one transponder and said base station; and,
determining the passing time of said at least one transponder with respect to the detection antenna on a basis applying a correction based on a time difference of selected characteristics occurring in the of the signal strengths of said first and second signals as the first and second transponder coils pass by the detection antenna.

14. A base station for determining a passing time of moving transponders passing a detection antenna, said base station being configured for:
during the passing of at least one transponder, the at least one transponder comprising a first transponder coil and a second transponder coil, receiving a sequence of first signals transmitted by the first transponder coil and receiving a sequence of second signals transmitted by the second transponder coil, wherein a direction of a magnetic axis of said first transponder coil differs from a direction of a magnetic axis of said second transponder coil;
associating said first and/or second signals with time instances indicating a time when said first and/or second signals are exchanged between said transponder and said base station; and,
determining the passing time of said transponder with respect to the detection antenna on a basis of applying a correction based on a time difference of selected characteristics occurring in the signal strengths of said first and second signals as the first and second transponder coils pass by the detection antenna.

15. A timing module for determining a passing time of a moving transponder passing a detection antenna of a base station, said module being configured for:
receiving first signal strength values associated with a sequence of first signals exchanged between a first transponder coil of the transponder and said base station; and, receiving second signal strength values associated with a sequence of second signals exchanged between a second transponder coil of the transponder and said base station, wherein a direction of a magnetic axis of said first transponder coil differs from a direction of a magnetic axis of said second transponder coil; wherein said first and second strength values are associated with time instances at which said first and/or second signals are exchanged between said transponder and said base station;
determining at least a first time instance T1 at which the first signal strength values associated with said first signals exchanged between the first transponder coil and the detection antenna has at least one minimum signal strength value and at least a second time instance T2 at which the second signal strength values associated with said second signals exchanged between the second transponder coil and the detection antenna has at least one maximum signal strength value; and,
determining a passing time Tp of said transponder with respect to the detection antenna by correcting T1 or T2 on a basis of based on a time difference between T1 and T2.

16. The timing module of claim 15 wherein determining the passing time Tp includes determining a difference between T1 and T2.

* * * * *